United States Patent
Negi et al.

(10) Patent No.: US 10,217,472 B2
(45) Date of Patent: Feb. 26, 2019

(54) SYSTEM AND METHOD FOR DATA TRANSMISSION OVER AN AUDIO JACK

(71) Applicant: Intel Corporation, Santa Clara, CA (US)

(72) Inventors: Indira Negi, San Jose, CA (US); Haibin Liu, Santa Clara, CA (US); Lakshman Krishnamurthy, Portland, OR (US); Alexander Essaian, San Jose, CA (US); Brian K. Vogel, Santa Clara, CA (US); Xiaochao Yang, San Jose, CA (US); Prasanna Singamsetty, San Jose, CA (US); Fuad Al-Amin, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/100,041

(22) PCT Filed: Dec. 28, 2013

(86) PCT No.: PCT/US2013/078145
§ 371 (c)(1),
(2) Date: May 27, 2016

(87) PCT Pub. No.: WO2015/099797
PCT Pub. Date: Jul. 2, 2015

(65) Prior Publication Data
US 2016/0379659 A1 Dec. 29, 2016

(51) Int. Cl.
*H04R 3/00* (2006.01)
*G10L 19/16* (2013.01)
*H04L 25/49* (2006.01)

(52) U.S. Cl.
CPC ............ *G10L 19/167* (2013.01); *H04L 25/49* (2013.01); *H04R 3/00* (2013.01)

(58) Field of Classification Search
USPC .......... 381/22, 23, 71.6, 74, 75, 80, 85, 94.8
See application file for complete search history.

(56) References Cited

U.S. PATENT DOCUMENTS 5,861,774 A * 1/1999 Blumenthal ....... G01R 31/2884
324/750.3
2004/0225207 A1 11/2004 Bae et al.
(Continued)

FOREIGN PATENT DOCUMENTS

JP 2005-072703 A 3/2005
WO 2015/099797 A1 7/2015

OTHER PUBLICATIONS

International Preliminary Report on Patentability and Written Opinion Received for PCT Patent Application No. PCT/US2013/078145, dated Jul. 7, 2016, 9 pages.
(Continued)

*Primary Examiner* — Yosef K Laekemariam
(74) *Attorney, Agent, or Firm* — Harley, Flight and Zimmerman, LLC

(57) ABSTRACT

A system and method for data transmission over an audio jack are disclosed. A particular embodiment includes: an audio interface including an audio jack, the audio interface including a right audio signal interface and a left audio signal interface; a data extractor coupled to the audio interface, the data extractor being configured to receive an audio stream via the audio interface and to isolate data encoded into the audio stream as out-of-phase data tones; and a microcontroller coupled to the data extractor to receive and process the data isolated by the data extractor.

11 Claims, 6 Drawing Sheets

(56) References Cited

U.S. PATENT DOCUMENTS

| | | |
|---|---|---|
| 2007/0257827 A1 | 11/2007 | Lee et al. |
| 2009/0180641 A1* | 7/2009 | J'maev .............. H04H 20/34 381/94.8 |
| 2009/0210236 A1* | 8/2009 | Moon .............. G10L 19/008 704/500 |
| 2010/0207584 A1 | 8/2010 | Spartano et al. |
| 2012/0177213 A1* | 7/2012 | Le Faucheur ........ H04R 1/1083 381/71.6 |

OTHER PUBLICATIONS

International Search Report with Written Opinion received for PCT Application No. PCT/US2013/078145, dated Sep. 26, 2014, 13 Pages.

* cited by examiner

```
┌─────────────────────────────────────────────┐
│  SYSTEM AND METHOD FOR DATA TRANSMISSION    │
│   OVER AN AUDIO JACK PROCESSING LOGIC       │
│                 -1100-                       │
└─────────────────────────────────────────────┘
                      │
                      ▼
┌─────────────────────────────────────────────┐
│ PROVIDE AN AUDIO INTERFACE INCLUDING AN     │
│ AUDIO JACK, THE AUDIO INTERFACE INCLUDING   │
│ A RIGHT AUDIO SIGNAL INTERFACE              │
│ AND A LEFT AUDIO SIGNAL INTERFACE.          │
│                 -1110-                       │
└─────────────────────────────────────────────┘
                      │
                      ▼
┌─────────────────────────────────────────────┐
│ ENCODE DATA INTO AN AUDIO STREAM AS         │
│ OUT-OF-PHASE DATA TONES AND TRANSFER THE    │
│ AUDIO STREAM WITH THE DATA TONES            │
│ VIA THE AUDIO INTERFACE TO A SLAVE DEVICE.  │
│                 -1120-                       │
└─────────────────────────────────────────────┘
                      │
                      ▼
┌─────────────────────────────────────────────┐
│ RECEIVE THE AUDIO STREAM FROM THE MASTER    │
│ DEVICE VIA THE AUDIO INTERFACE AND ISOLATE  │
│ THE DATA ENCODED INTO THE AUDIO STREAM AS   │
│ OUT-OF-PHASE DATA TONES.                    │
│                 -1130-                       │
└─────────────────────────────────────────────┘
                      │
                      ▼
┌─────────────────────────────────────────────┐
│     PROCESS THE ISOLATED DATA AT THE        │
│              SLAVE DEVICE.                  │
│                 -1140-                       │
└─────────────────────────────────────────────┘
                      │
                      ▼
                   ( END )
```

FIGURE 5

SYSTEM AND METHOD FOR DATA TRANSMISSION OVER AN AUDIO JACK

TECHNICAL FIELD

This patent application relates to electronic systems, peripheral devices, mobile devices, and computer-implemented software, according to various example embodiments, and more specifically to a system and method for data transmission over an audio jack.

BACKGROUND

Smartphones are becoming the predominant link between people and information. Most current smartphones or other mobile devices provide a capability to use mobile software applications (apps). A mobile software application (app) can embody a defined set of functionality and can be installed and executed on a mobile device, such as a smartphone, a tablet device, laptop computer, a digital camera, or other form of mobile computing, imaging, or communications device. Conventional mobile apps are available that focus on particular applications or functionality sets. Additionally, most standard mobile phones and other mobile devices have an audio/microphone connector or 3.5 mm audio jack into which a headset, earbuds, or other peripheral device connector can be plugged. Most standard headsets or earbud accessories also include a microphone so the user can both hear audio from the phone and speak into the phone via the headset or earbud accessory. A plug connected to the headsets, earbuds, or other peripheral device can include separate conductive elements to transfer electrical signals corresponding to the left ear audio, right ear audio, microphone audio, and ground. The plug is compatible with the mobile device audio jack. The standard headsets or earbud accessories are configured to be placed over or attached to the ear(s) of a person, and include one or more speakers and a microphone. The headset, earbuds, and/or other types of peripheral devices may include one or more physiological or biometric sensors, environmental sensors, and/or other types of data-producing elements.

Computing devices, communication devices, imaging devices, electronic devices, accessories, or other types of peripheral devices designed to be worn or attached to a user (denoted as wearables or wearable devices) and the associated user experience are also becoming very popular. Mobile phone headsets and earbud accessories are examples of such wearables. Because wearable devices are typically worn by or attached to the user all or most of the time, it is important that wearables serve as a helpful tool aiding the user when needed, and not become an annoying distraction when the user is trying to focus on other things. Although the 3.5 mm audio jack is a ubiquitous interface available on almost every phone, smartphone, tablet computer, and computer, this interface has been used only for transferring audio signals to the peripheral device. In most other cases, peripheral devices have to include a wireless transceiver, such as Bluetooth™ to transfer data between the mobile device and the peripheral device. However, wireless interfaces can be more expensive, more bulky, and less reliable. Additionally, if the audio jack is used for stereo audio signals, it is difficult to send data on the audio interface.

BRIEF DESCRIPTION OF THE DRAWINGS

The various embodiments are illustrated by way of example, and not by way of limitation, in the figures of the accompanying drawings in which:

FIG. 5 is a processing flow chart illustrating an example embodiment of a method as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
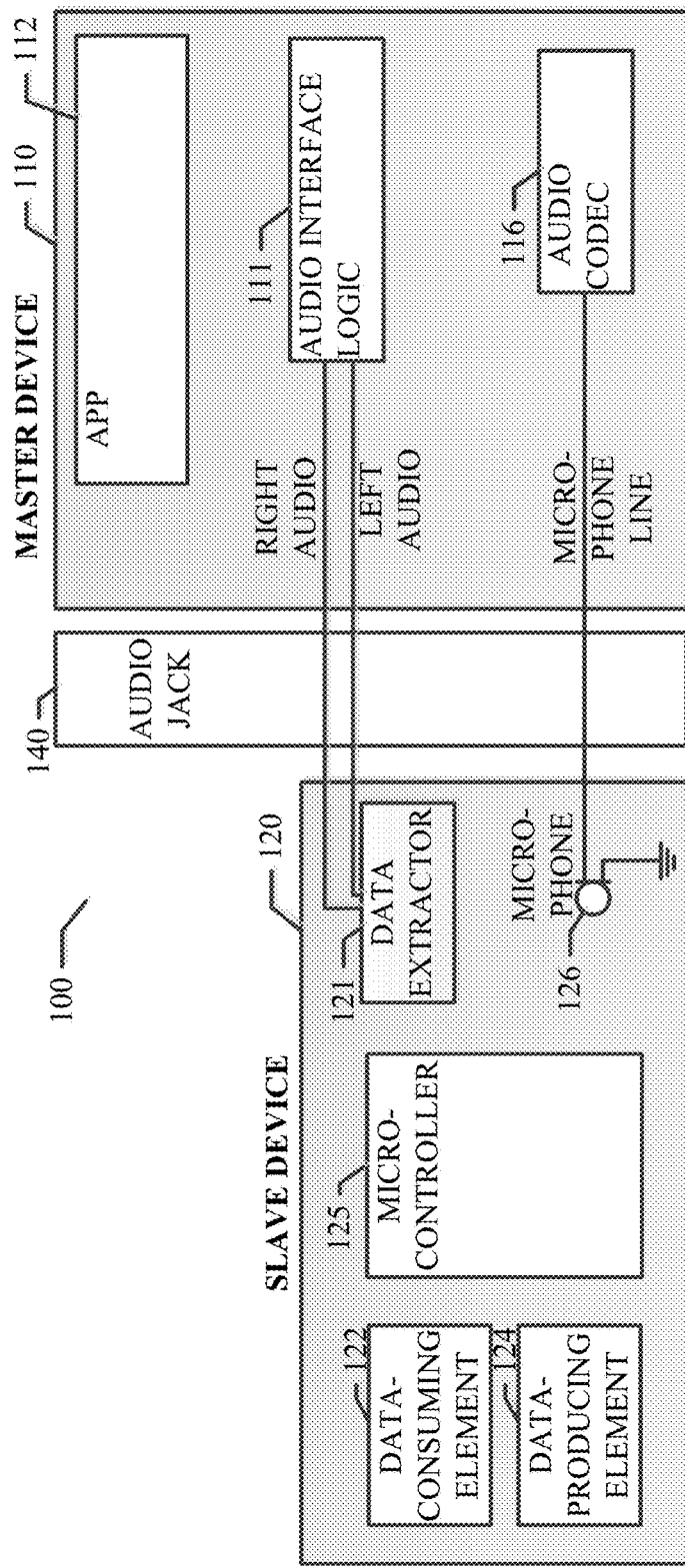
FIG. 1 illustrates an example embodiment configured for transferring data between a master device and a slave device via the audio/microphone wire and a standard audio jack.

In the various embodiments described herein, a system and method for data transmission over an audio jack are disclosed. Referring now to FIG. 1, an example embodiment 100 described herein is configured for transferring data between a master device 110 and a slave device 120 via the audio/microphone wire and a standard audio jack 140. In the example embodiment of FIG. 1, the master device 110 can include a mobile device, a smartphone, a tablet computing device, laptop computer, desktop computer, personal computer (PC), a personal digital assistant (PDA), global positioning system (GPS) device, an imaging device, an audio or video player or capture device, or other form of computing, communications, imaging, or electronic device that provides a standard audio jack 140. In the various embodiments described herein, the master device 110 typically produces the stereo audio signals, which can be transferred to a slave device 120 via the audio jack 140 in a standard manner.

In the example embodiment, the slave device 120 can include a variety of different types of devices including, computing devices, communication devices, imaging devices, electronic devices, accessories, or other types of peripheral devices designed to be used in a stand-alone configuration or worn or attached to a user (denoted as wearables or wearable devices). Mobile phone headsets and earbud accessories are examples of such slave devices 120. The slave device 120 (also denoted herein as a peripheral device) can include the speakers for rendering the stereo audio signals received from the master device 110 via the audio jack 140 in a standard manner.

The various embodiments described herein use a variety of different methods for embedding data into stereo audio signals without affecting the quality of music or other audio signals transferred via an audio interface (e.g., audio jack 140). The stereo audio signals with the embedded data can be used by the master device 110 to send data to a slave device 120 connected through the standard 3.5 mm audio jack 140. Various data-consuming elements 122 in the slave device 120 can use this data for a variety of purposes including, configuring the slave device 120, setting parameters, conveying messages or notifications, updating application data, updating slave device 120 software, firmware, or processing logic, and the like. A microcontroller 125 can also be provided in the slave device 120 to control the operation and functionality of the slave device 120. Such microcontrollers are well-known in the art. In one embodiment, the slave device 120 can also provide one or more data-producing elements 124. In a particular embodiment, the data-producing elements 124 can be a biometric sensor, such as a heart rate sensor, which can produce sensor data in the slave device 120. In the example embodiment, this sensor data can be transmitted to the master device 110, such as a mobile phone, to which the slave device 120 is coupled via an audio/microphone wire and the audio jack 140. In other embodiments, it will be apparent to those of ordinary skill in the art in view of the disclosure herein that many other types of data-producing components 124 in the slave device 120 may be similarly deployed. For example, these other types of data-producing components 124 can include environmental sensors, motion sensors, image or video-producing devices, and the like. The slave device 120 can also include a microphone 126, which can transfer audio signals from the slave device 120 to the master device 110 via the electrical audio/microphone wire, audio jack 140, and an audio encoder/decoder (codec) 116 in the master device 110. In the example embodiment, the master device 110 can include a software application (app) 112, which can embody a defined set of functionality and can be installed and executed on the master device 110 in a well-known manner.

One basic principle used in various example embodiments is that the master device 110 can produce ultrasonic or infrasonic data tones, on the left and right audio channels, and can add the data tones to the output audio stream. As shown in FIG. 1, the example embodiment provides the audio interface logic 111 for this purpose. The added data tones cannot be heard by humans, but can be detected by various techniques in the slave device 120 as described herein. In a particular example embodiment, the master device 110 can produce out-of-phase data tones on the left and right audio channels. These out-of-phase data tones can be differentiated from music or other audio signals in the audio stream, which is mostly in phase with very small out-of-phase components. As described in more detail below in several example embodiments, various systems and methods are described by which the slave device 120 can detect out-of-phase data tones generated by the master device 110 using very limited power or no power at all. In this manner, data can be transferred from the master device 110 to the slave device 120.

Music, and other audio signals, is a mostly in-phase signal, with a very small magnitude of out-of-phase components. The master device 110 can use this characteristic of music, and other audio signals, to generate data tones that are 180 degrees out of phase between the left and right channels of the stereo audio stream. To ensure that the tones produced have a high enough amplitude for the techniques described herein, the out-of-phase tones can be produced on a notification stream of the master device 110 and not on the audio stream. The notification stream is a stream with well-known characteristics typically transmitted prior to a corresponding audio stream. In other embodiments, the out-of-phase tones can be produced on the audio stream. The audio stream volume can be controlled by the user. Two example embodiments, described in more detail below, use the out-of-phase signals inserted into the notification or audio stream to transfer data from a master device 110 to a slave device 120 via the audio jack. The slave device 120 can use similar techniques to detect that a data tone has been inserted into the audio stream and to decode the inserted data. In another embodiment also described below, a system and method is described for transferring data from a slave device 120 to a master device 110 via the audio jack.

At least two basic problems are solved by the example embodiments described herein. These problems include: 1) how can data be sent from the master device 110 to the slave device 120 via the audio jack, and 2) how can data be sent from the slave device 120 to the master device 110 via the audio jack. The solutions provided by the various example embodiments are described in more detail below.

Sending Data from a Master Device to a Slave Device Via the Audio/Microphone Wire and Audio Jack Referring again to FIG. 1, the example embodiment 100 described herein is configured for sending data from a master device 110 to a slave device 120 via the audio/microphone wire and the audio jack 140. In the embodiment of FIG. 1, a master device 110 includes audio interface logic 111. The audio interface logic 111 provides the processing logic and/or the circuitry to encode data produced in or obtained by the master device 110 into a series of data tones that can be embedded into the audio stream being transferred to the slave device 120 via the audio jack 140. In particular, the audio interface logic 111 performs data encoding by producing ultrasonic or infrasonic tones, on the left and right audio channels, which are added to the output audio stream sent to the slave device 120 via the audio jack 140 as shown in FIG. 1. The audio interface logic 111 generates data tones that are 180 degrees out of phase between the left and right channels of the stereo audio stream. A data extractor component 121 of the slave device 120 can receive the right and left audio channels with the data tones encoded therein from the master device 110 via the left and right audio channel conductors of audio jack 140. The data extractor 121 can decode the data tones from the audio stream using the decoding techniques described below. The audio interface logic 111 can encode the data tones into the audio stream using a reverse of the decoding techniques described below. Audio interface logic 111 can be configured as processing logic or logic, at least a portion of which is partially implemented in hardware. In two example embodiments described in detail below, the data extractor 121 can perform the data decoding using: 1) a self-powered out-of-phase tone voltage tripler, or 2) a low power out-of-phase tone pulse counter. These embodiments are described next.

Method 1: Self Powered Out-of-Phase Tone Voltage Tripler

Figure 2:
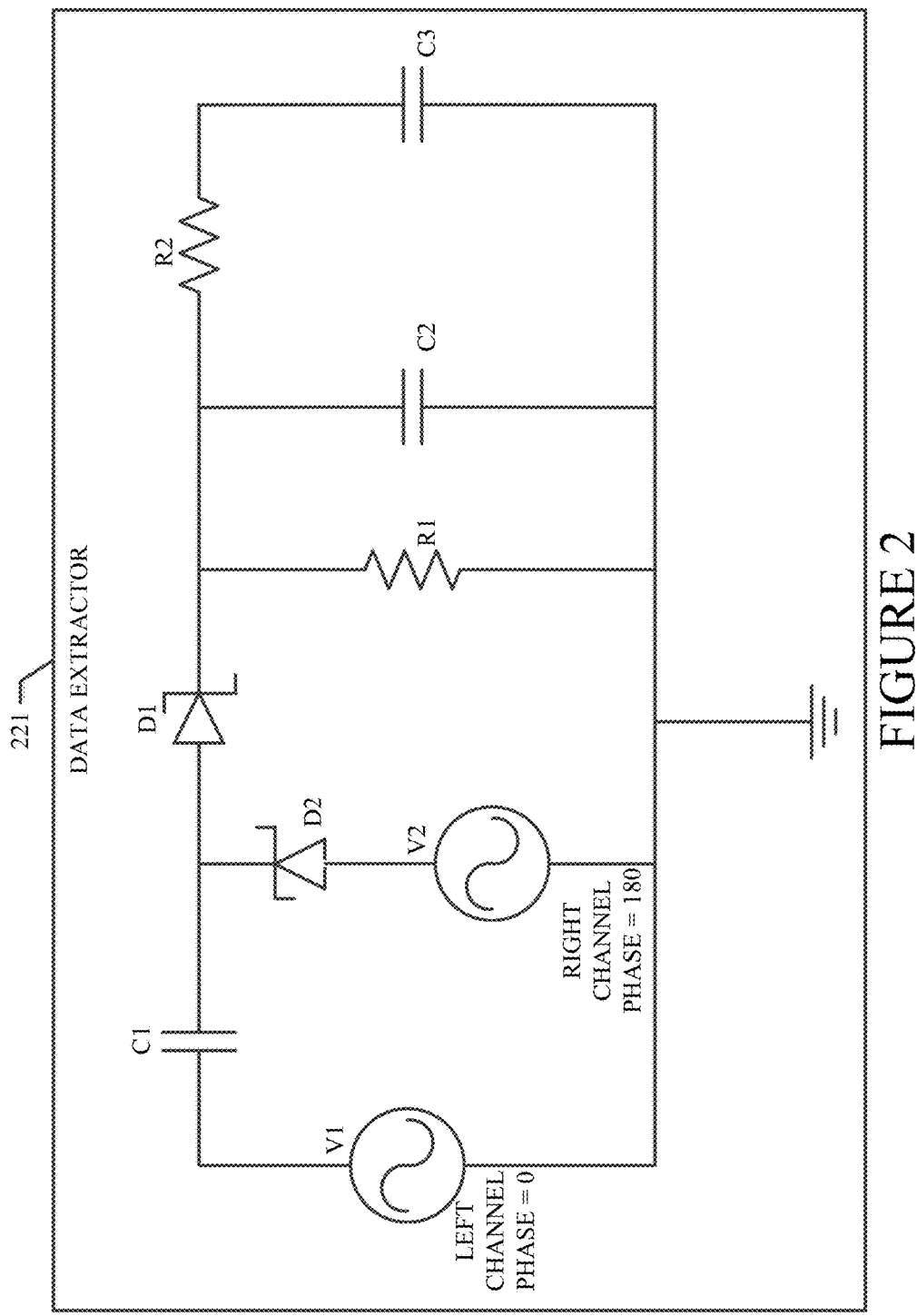
FIG. 2 illustrates an example embodiment of a self-powered out-of-phase tone voltage tripler system and process.

Referring now to FIG. 2, a self-powered out-of-phase tone voltage tripler system and process is illustrated. The example embodiment of the data decoding system shown in FIG. 2 can be implemented in a data extractor 221 of the slave device 120. In an example embodiment, the data extractor 221 can receive the right and left audio channels with the data tones encoded therein from the master device 110 via the audio jack 140. If the two received signals (right and left channels) are in phase, the data extractor 221, as implemented by the example circuit shown in FIG. 2, acts like a half wave rectifier and its output is about Vm−2*Vd (where Vm is the signal amplitude voltage, and Vd is the diode's D1 or D2 forward voltage drop). Suppose, for example, that Vm=0.8V and Vd=0.2V. In this example, the data extractor 221 circuit shown in FIG. 2 produces 0.4V as the output for normal music (or other standard audio) signals whose two channels (left and right) are in-phase more or less. If the signals on the two channels (left and right) are out-of-phase, the data extractor 221 circuit works as a voltage tripler and its output is 3*Vm−2*Vd. Still using the numbers from the example set forth above, the data extractor 221 produces a high output voltage of 2.4V−0.4V=2V when the two audio channels (left and right) are out-of-phase. The data extractor 221 circuit changes its behavior significantly when the phase relationship of the audio channel inputs changes. To use the data extractor 221 circuit shown in FIG. 2 as a data tone detector, a resistor-capacitor (RC) low pass filter is added at the output as shown in FIG. 2 to filter out possible short time spikes from out-of-phase music (or other standard audio) signals. It will be apparent to those of ordinary skill in the art in view of the disclosure herein that a memory device can be added to the circuit shown in FIG. 2 to retain the isolated data. In this manner, data signals encoded as out-of-phase data tones on the two audio channels of an audio stream can be isolated from the typically in-phase audio signals of music (or other standard audio) on the two audio channels. In one embodiment, the value of resistor R1 shown in FIG. 2 can be 10 k ohms, the value of capacitor C1 can be 0.1 uF, and the value of capacitor C2 can be 20 uF. It will be apparent to those of ordinary skill in the art in view of the disclosure herein that alternative values can also be used.

Method 2: Low Power Out-of-Phase Tone Pulse Counter

Figure 3:
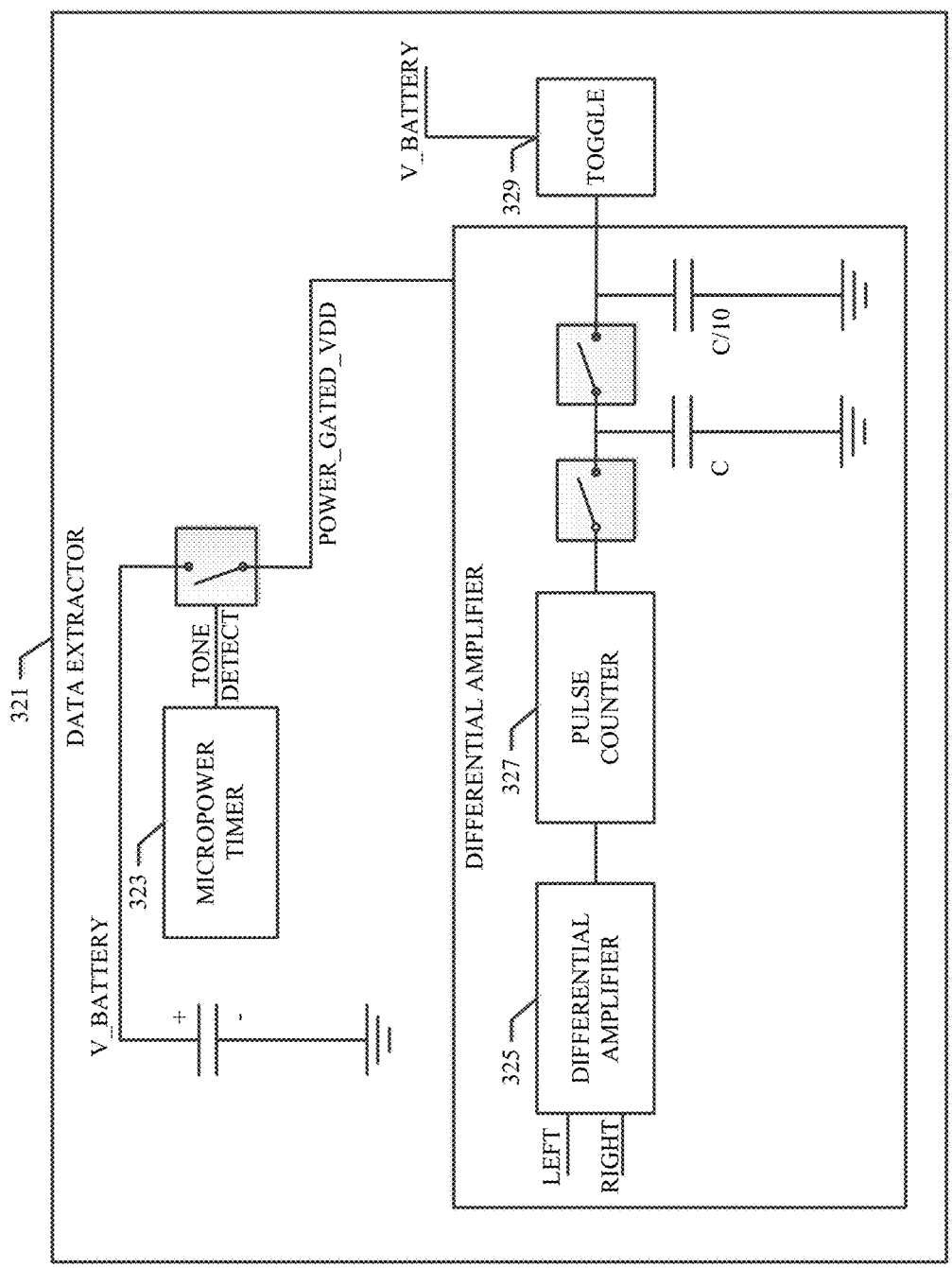
FIG. 3 illustrates an example embodiment of a low power out-of-phase tone pulse counter system and process.

Referring now to FIG. 3, another system and process for decoding data embedded in an audio signal is described. In the example of FIG. 3, a low power out-of-phase tone pulse counter system and process is illustrated. This example embodiment provides a very low power technique for data decoding, typically consuming under 30 uA. The example embodiment of FIG. 3 uses a micropower timer 323 to control the duty cycling of the tone detection process. The micropower timer 323 is a commercially available programmable counter that uses very little power. The left and right audio channel signals of the audio stream received from the master device 110 are inputs to a differential amplifier 325. Because the data tones encoded into the audio signals by the master device 110 have out-of-phase components, the differential amplifier 325 produces pulses at the tone frequency at its output in response to these out-of-phase components. In contrast, the music or other standard audio signals that are combined with the data tones in the audio stream are mostly in-phase and do not produce as many pulses while the audio stream is being processed. These pulses produced by the differential amplifier 325 in response to the out-of-phase components of the audio stream are counted by the pulse counter 327. When the last flip-flop on the counter turns on (i.e., the pulse counter 327 counts n number of pulses), the capacitor C shown in FIG. 3 gets charged up. It will be apparent to those of ordinary skill in the art in view of the disclosure herein that the pulse counter 327 can be pre-configured to count up to a pre-determined value (n) before charging up capacitor C. In other words, the pulse counter 327 can be pre-configured to require that n pulses are received before capacitor C is activated. Therefore, the tone detection process of an example embodiment can be configured such that only the out-of-phase tones at the pre-configured ultrasonic frequency, produced by the master device 110, will cause the last bit on the pulse counter 327 to flip and thereby activate capacitor C. As part of a pre-defined data tone detection duty cycle controlled by micropower timer 323, the pulse counter 327 resets and starts counting pulses again. As the tone detection duty cycle resets, the capacitor C is disconnected from the pulse counter 327, and any charge on the capacitor C is transferred to a smaller capacitor C/10 as shown in FIG. 3. The duty cycle of the tone detection process is chosen such that if capacitor C/10 was charged up to high, capacitor C/10 would not discharge to low within the duty cycle duration. In this fashion, capacitor C/10 will only go from low to high if a data tone was detected in the audio stream, after previous periods of the absence of a data tone. The toggle flip-flop 329 can store the state to retain an indication that a data tone was received. In this manner, data signals encoded as out-of-phase data tones on the two audio channels of an audio stream can be isolated from the typically in-phase audio signals of music (or other standard audio) on the two audio channels.

The example embodiments described herein make use of the fact that the master device 110 can produce out-of-phase signals on the two audio channels—left and right. The systems and methods described herein use this feature of the produced data signal to encode the data into the audio stream at the master device 110 and to identify and decode the data signals from the audio stream at the slave device 120. The various embodiments described herein provide a platform for accessory developers, or other peripheral device developers, that allows them to implement a system and method to transfer data signals between a master device (e.g., a phone, tablet, PC, or other device) and a slave or peripheral device via the stereo audio line/interface, without interfering with the user's experience of listening to music, or other audio signals, through a standard 3.5 mm audio jack. The various embodiments also provide a platform that can be used by developers to add different sensors and functionality into the peripheral device, which can be configured and controlled using data sent from the master device.

Figure 4:
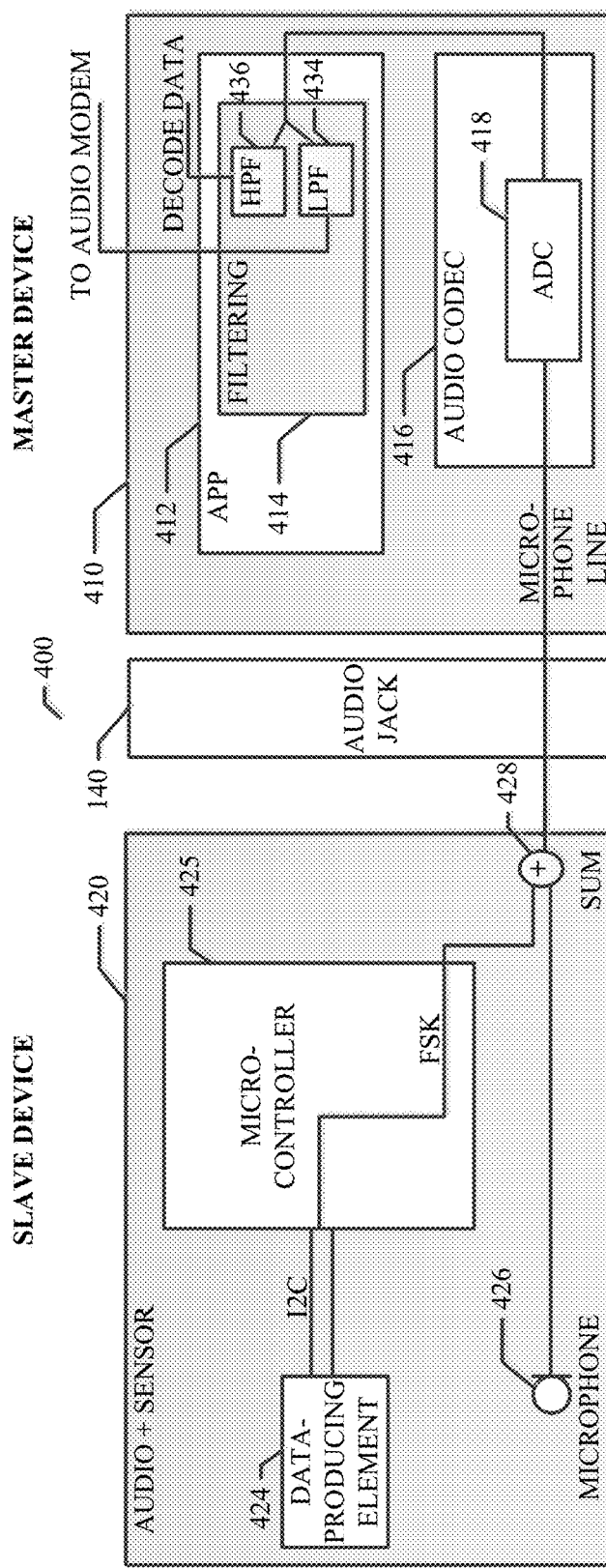
FIG. 4 illustrates an example embodiment configured fobr sending data from a slave device to a master device via the audio/microphone wire and the audio jack.

Sending Data from a Slave Device to a Master Device Via the Audio/Microphone Wire and Audio Jack Referring now to FIG. 4, an example embodiment 400 described herein is configured for sending data from a slave device 420 to a master device 410 via the audio/microphone wire and the audio jack 140. In the embodiment of FIG. 4, a slave device 420 (e.g., headsets, earbuds, or the like) can include one or more data-producing elements 424, such as the sensors described above. As described above, these sensors can be biometric sensors, environmental sensors, or other data-producing component. In a particular example embodiment, the sensors can be optical sensors for detecting heart rate, an infrared (IR) LED, an accelerometer, and/or the like. The slave device 420 can also include a microphone 426, which can transfer audio signals from the slave device 420 to a master device 410 via an electrical audio/microphone wire and audio jack 140 in a standard manner. The slave device 420 can also be configured to include a microcontroller 425 (e.g., an MSP430, or other type of microcontroller). It will be apparent to those of ordinary skill in the art in view of the disclosure herein that a variety of standard microcontrollers, application specific integrated circuits (ASICs), field programmable gate arrays (FPGAs), discrete logic circuits, or other circuitry or logic can be similarly used as the microcontroller 425 of the example embodiments. The microcontroller 425 can receive the sensor data produced by the data-producing element 424. The sensor data produced by the one or more data-producing elements 424 in the slave device 420 can be encoded into a modulation format and sent to the microcontroller 425 for processing. In one example embodiment, the sensor data is provided as I2C signals. I2C (also denoted I$^2$C or Inter-Integrated Circuit) is a multimaster, serial, single-ended computer bus used for attaching low-speed peripherals to a motherboard, embedded system, cellphone, or other electronic device. It will be apparent to those of ordinary skill in the art that the sensor data can be provided in a variety of different forms, formats, protocols, or signals. The microcontroller 425 can convert the sensor data to an audio band signal using FSK (frequency-shift keying) or other well-known encoding technique. The converted data from the data-producing elements 424 is added into or otherwise combined with the audio/microphone wire signals using an adder 428 for transfer to a master device 410 via the standard audio jack 140.

Referring still to FIG. 4, a master device 410 of an example embodiment is shown coupled to the slave device 420 via audio jack 140. As described above, the master device 410 can include a wide variety of different types of devices, such as computing, communications, imaging, or electronic devices that provide a standard audio jack 140. Such master devices 410 can include standard components, such as an audio encoder/decoder (codec) 416 and analog-to-digital converter (ADC) 418. As described above, master device 410 can also include an application (app) 412, which can comprise downloaded software, firmware, or other form of customized processing logic. App 412 can be configured to include a filtering component 414. Filtering component 414 can include a low pass filter (LPF) 434 and a high pass filter (HPF) 436. App 412 can also be configured as processing logic or logic, at least a portion of which is partially implemented in hardware, the logic including the filtering component 414 coupled with an output of the analog-to-digital converter (ADC) 418.

Sensor data sent from the slave device 420 to the master device 410 via the audio/microphone wire and the audio jack 140 is received and sampled in the standard codec 416 provided in a conventional master device 410. The codec 416 can use the analog-to-digital converter (ADC) 418, to produce digital signals that are received by the filtering component 414 of the app 412 executing on the master device 410. The LPF 434 can be used to isolate the standard audio signals produced by microphone 426. These audio signals can be passed to an audio modem or rendering device. The HPF 436 can be used to isolate the encoded sensor data received from the data-producing elements 424. The isolated sensor data can be passed to a decoder component, which processes and analyzes the sensor data produced in slave device 420. In this manner, the example embodiment can send sensor data produced in a slave device to a master device for processing by a master device app via the audio/microphone wire and the audio jack. The described embodiment provides the advantage that sensor data can be transferred from the slave device to the master device via the audio jack, without having to modify the hardware of the master device. Further, the embodiment does not require a wireless connection to the master device.

Referring now to FIG. 5, a processing flow diagram illustrates an example embodiment of a method for data transmission over an audio jack as described herein. The method 1100 of an example embodiment includes: providing an audio interface including an audio jack, the audio interface including a right audio signal interface and a left audio signal interface (processing block 1110); encoding data into an audio stream as out-of-phase data tones and transferring the audio stream with the data tones via the audio interface to a slave device (processing block 1120); receiving the audio stream from the master device via the audio interface and isolating the data encoded into the audio stream as out-of-phase data tones (processing block 1130); and processing the isolated data at the slave device (processing block 1140).

Figure 6:
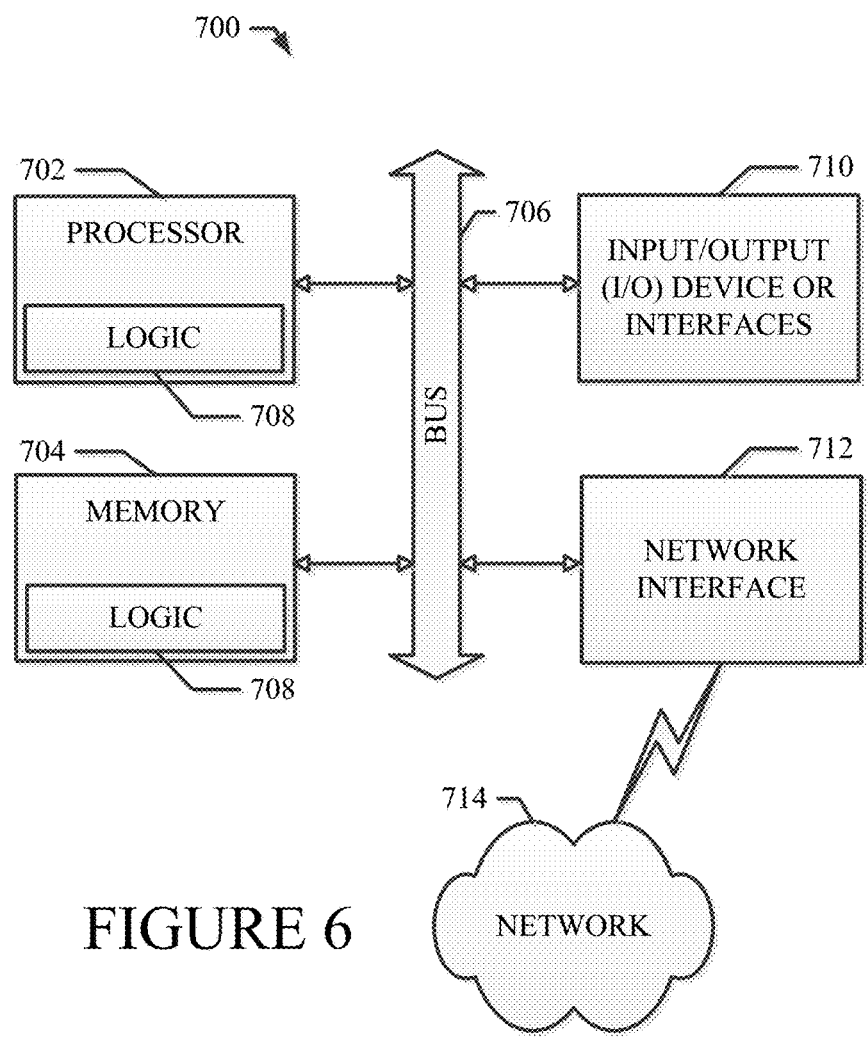
FIG. 6 shows a diagrammatic representation of a machine in the example form of a mobile computing and/or communication system within which a set of instructions when executed and/or processing logic when activated may cause the machine to perform any one or more of the methodologies described and/or claimed herein.

FIG. 6 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM). General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

A slave device comprising: an audio interface including an audio jack, the audio interface including a right audio signal interface and a left audio signal interface; a data extractor coupled to the audio interface, the data extractor being configured to receive an audio stream via the audio interface and to isolate data encoded into the audio stream as out-of-phase data tones; and a microcontroller coupled to the data extractor to receive and process the data isolated by the data extractor.

The slave device as claimed above wherein the audio stream including a right audio channel received on the right audio signal interface and a left audio channel received on the left audio signal interface, the data tones being out of phase between the left and right audio channels of the audio stream.

The slave device as claimed above wherein the data extractor further including a self-powered out-of-phase tone voltage tripler.

The slave device as claimed above wherein the data extractor further including a low power out-of-phase tone pulse counter.

The slave device as claimed above wherein the audio jack is a 3.5 mm audio jack.

The slave device as claimed above wherein the slave device including a data-producing element, the microcontroller being coupled to the data-producing element to receive data generated by the data-producing element, the microcontroller being further configured to encode the data into an audio band signal, the slave device including an adder to combine the encoded data with audio signals on a microphone line, the adder being further configured to transfer the combined audio signals to a master device via a microphone conductor of the audio jack.

The slave device as claimed above wherein the slave device being from the group consisting of: a mobile phone headset and an earbud accessory.

The slave device as claimed above wherein the data isolated by the data extractor being peripheral device configuration data.

A master device comprising: logic, at least a portion of which is partially implemented in hardware, the logic configured to encode data into an audio stream as out-of-phase data tones and to transfer the audio stream with the data tones via an audio interface and an audio jack, the audio interface including a right audio signal interface and a left audio signal interface.

The master device as claimed above wherein the audio stream including a right audio channel transferred on the right audio signal interface and a left audio channel transferred on the left audio signal interface, the data tones being out of phase between the left and right audio channels of the audio stream.

The master device as claimed above wherein the logic being further configured to encode the data tones for decoding by a self-powered out-of-phase tone voltage tripler.

The master device as claimed above wherein the logic being further configured to encode the data tones for decoding by a low power out-of-phase tone pulse counter.

The master device as claimed above wherein the audio jack is a 3.5 mm audio jack.

The master device as claimed above further including an encoder/decoder (codec), which includes an analog-to-digital converter (ADC) being coupled to a microphone conductor of the audio jack, the logic being further configured to include a filtering component coupled with an output of the ADC, the filtering component being configured to isolate encoded data received in audio signals via a microphone conductor of the audio jack.

The master device as claimed above wherein the master device being from the group consisting of: a mobile phone, a tablet computing device, a laptop computer, a desktop computer, and a personal computer (PC).

The master device as claimed above wherein the encoded data being peripheral device configuration data.

A system comprising: a master device including an audio interface including an audio jack, the audio interface including a right audio signal interface and a left audio signal interface; and logic, at least a portion of which is partially implemented in hardware, the logic configured to encode data into an audio stream as out-of-phase data tones and to transfer the audio stream with the data tones via the audio interface and the audio jack; and a slave device including an audio interface including an audio jack, the audio interface including a right audio signal interface and a left audio signal interface; a data extractor coupled to the audio interface, the data extractor being configured to receive the audio stream from the master device via the audio interface and the audio jack and to isolate the data encoded into the audio stream as out-of-phase data tones; and a microcontroller coupled to the data extractor to receive and process the data isolated by the data extractor.

The system as claimed above wherein the audio stream including a right audio channel transferred on the right audio signal interface and a left audio channel transferred on the left audio signal interface, the data tones being out of phase between the left and right audio channels of the audio stream.

The system as claimed above wherein the data extractor further including a self-powered out-of-phase tone voltage tripler.

The system as claimed above wherein the data extractor further including a low power out-of-phase tone pulse counter.

A slave device method comprising: receiving an audio stream via an audio interface and an audio jack; isolating data encoded into the audio stream as out-of-phase data tones; and processing the data isolated by the data extractor.

The method as claimed above wherein the audio stream including a right audio channel received on a right audio signal interface and a left audio channel received on a left audio signal interface, the data tones being out of phase between the left and right audio channels of the audio stream.

The method as claimed above wherein the audio jack is a 3.5 mm audio jack.

The method as claimed above including receiving data generated by a data-producing element, encoding the data into an audio band signal, combining the encoded data with audio signals on a microphone line, and transferring the combined audio signals to a master device via a microphone conductor of the audio jack.

The method as claimed above wherein the method being performed by a slave device being from the group consisting of: a mobile phone headset and an earbud accessory.

The method as claimed above wherein the isolated data is peripheral device configuration data.

A master device method comprising: encoding data into an audio stream as out-of-phase data tones; and transferring the audio stream with the data tones via an audio interface and an audio jack, the audio interface including a right audio signal interface and a left audio signal interface.

The method as claimed above wherein the audio stream including a right audio channel transferred on the right audio signal interface and a left audio channel transferred on the left audio signal interface, the data tones being out of phase between the left and right audio channels of the audio stream.

The method as claimed above including encoding the data tones for decoding by a self-powered out-of-phase tone voltage tripler.

The method as claimed above including encoding the data tones for decoding by a low power out-of-phase tone pulse counter.

The method as claimed above wherein the audio jack is a 3.5 mm audio jack.

The method as claimed above further including isolating encoded data received in audio signals via a microphone conductor of the audio jack.

The method as claimed above wherein the method being performed by a master device being from the group consisting of: a mobile phone, a tablet computing device, a laptop computer, a desktop computer, and a personal computer (PC).

The method as claimed above wherein the encoded data being peripheral device configuration data.

A slave apparatus comprising: an audio interfacing means including an audio jack, the audio interfacing means including a right audio signal interface and a left audio signal interface; a data extractor means coupled to the audio interfacing means, the data extractor means being configured to receive an audio stream via the audio interfacing means and to isolate data encoded into the audio stream as out-of-phase data tones; and a processing means coupled to the data extractor means to receive and process the data isolated by the data extractor means.

The slave apparatus as claimed above wherein the audio stream including a right audio channel received on the right audio signal interface and a left audio channel received on the left audio signal interface, the data tones being out of phase between the left and right audio channels of the audio stream.

The slave apparatus as claimed above wherein the data extractor further including a self-powered out-of-phase tone voltage tripler means.

The slave apparatus as claimed above wherein the data extractor further including a low power out-of-phase tone pulse counter means.

The slave apparatus as claimed above wherein the audio jack is a 3.5 mm audio jack.

The slave apparatus as claimed above including a data-producing means, the processing means being coupled to the data-producing means to receive data generated by the data-producing means, the processing means being further configured to encode the data into an audio band signal, the slave apparatus including a combining means to combine the encoded data with audio signals on a microphone line, the combining means being further configured to transfer the combined audio signals to a master apparatus via a microphone conductor of the audio jack.

The slave apparatus as claimed above wherein the slave apparatus being from the group consisting of: a mobile phone headset and an earbud accessory.

The slave apparatus as claimed above wherein the data isolated by the data extractor means being peripheral device configuration data.

A master apparatus comprising: logic means, at least a portion of which is partially implemented in hardware, the logic means configured to encode data into an audio stream as out-of-phase data tones and to transfer the audio stream with the data tones via an audio interface and an audio jack, the audio interface including a right audio signal interface and a left audio signal interface.

The master apparatus as claimed above wherein the audio stream including a right audio channel transferred on the right audio signal interface and a left audio channel transferred on the left audio signal interface, the data tones being out of phase between the left and right audio channels of the audio stream.

The master apparatus as claimed above wherein the logic means being further configured to encode the data tones for decoding by a self-powered out-of-phase tone voltage tripler.

The master apparatus as claimed above wherein the logic means being further configured to encode the data tones for decoding by a low power out-of-phase tone pulse counter.

The master apparatus as claimed above wherein the audio jack is a 3.5 mm audio jack.

The master apparatus as claimed above further including an encoder/decoder means, which includes an analog-to-digital converter (ADC) being coupled to a microphone conductor of the audio jack, the logic means being further configured to include a filtering means coupled with an output of the ADC, the filtering means being configured to isolate encoded data received in audio signals via a microphone conductor of the audio jack.

The master apparatus as claimed above wherein the master apparatus being from the group consisting of: a mobile phone, a tablet computing device, a laptop computer, a desktop computer, and a personal computer (PC).

The master apparatus as claimed above wherein the encoded data being peripheral device configuration data.

A non-transitory machine-useable storage medium embodying instructions which, when executed by a machine, cause the machine to: receive an audio stream via an audio interface and an audio jack; isolate data encoded into the audio stream as out-of-phase data tones; and process the data isolated by the data extractor.

The machine-useable storage medium as claimed above wherein the audio stream including a right audio channel received on a right audio signal interface and a left audio channel received on a left audio signal interface, the data tones being out of phase between the left and right audio channels of the audio stream.

The machine-useable storage medium as claimed above wherein the audio jack is a 3.5 mm audio jack.

The machine-useable storage medium as claimed above being further configured to receive data generated by a data-producing element, encode the data into an audio band signal, combine the encoded data with audio signals on a microphone line, and transfer the combined audio signals to a master device via a microphone conductor of the audio jack.

The machine-useable storage medium as claimed above wherein the instructions being embodied in a slave device being from the group consisting of: a mobile phone headset and an earbud accessory.

The machine-useable storage medium as claimed above wherein the isolated data is peripheral device configuration data.

A non-transitory machine-useable storage medium embodying instructions which, when executed by a machine, cause the machine to: encode data into an audio stream as out-of-phase data tones; and transfer the audio stream with the data tones via an audio interface and an audio jack, the audio interface including a right audio signal interface and a left audio signal interface.

The machine-useable storage medium as claimed above wherein the audio stream including a right audio channel transferred on the right audio signal interface and a left audio channel transferred on the left audio signal interface, the data tones being out of phase between the left and right audio channels of the audio stream.

The machine-useable storage medium as claimed above being further configured to encode the data tones for decoding by a self-powered out-of-phase tone voltage tripler.

The machine-useable storage medium as claimed above being further configured to encode the data tones for decoding by a low power out-of-phase tone pulse counter.

The machine-useable storage medium as claimed above wherein the audio jack is a 3.5 mm audio jack.

The machine-useable storage medium as claimed above being further configured to isolate encoded data received in audio signals via a microphone conductor of the audio jack.

The machine-useable storage medium as claimed above wherein the instructions being embodied in a master device being from the group consisting of: a mobile phone, a tablet computing device, a laptop computer, a desktop computer, and a personal computer (PC).

The machine-useable storage medium as claimed above wherein the encoded data being peripheral device configuration data.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A slave device comprising:
    an audio interface including an audio jack, the audio interface including a right audio signal interface to receive a right audio channel from the audio interface and a left audio signal interface to receive a left audio channel from the audio interface;
    a data extractor coupled to the audio interface, the data extractor including at least one of a self-powered out-of-phase tone voltage tripler or a low power out-of-phase tone pulse counter, the data extractor configured to:
        compare a first voltage of the received right audio channel to a second voltage of the received left audio channel to detect a difference indicative of tones having a phase difference and encoded on the right audio channel and the left audio channel, respectively; and
        responsive to the difference, output an indication of data represented by the tones; and
    a microcontroller coupled to the data extractor to receive and process the data isolated by the data extractor.

2. The slave device as claimed in claim 1, wherein the left audio channel and the right audio channel include data tones representative of the data, the data tones being out of phase between the left and right audio channels.

3. The slave device as claimed in claim 1, wherein the slave device includes a data-producing element, the microcontroller coupled to the data-producing element to receive data generated by the data-producing element, the microcontroller further configured to encode the data into an audio band signal, the slave device including an adder to combine the encoded data with audio signals on a microphone line to prepare combined audio signals, the adder further configured to transfer the combined audio signals to a master device via a microphone conductor of the audio jack.

4. The slave device as claimed in claim 1, wherein the slave device is from the group consisting of: a mobile phone headset and an earbud accessory.

5. A master device comprising:
    logic, at least a portion of which is partially implemented in hardware, configured to:
        encode data into audio as out-of-phase data tones for decoding by at least one of a self-powered out-of-phase tone voltage tripler or a low power out-of-phase tone pulse counter, wherein a first data tone of the data tones is included in a right channel of the audio and second data tone of the data tones is included in a left channel of the audio, wherein there is a phase difference between the first data tone and the second data tone; and
        transfer the audio with the data tones via an audio interface and an audio jack, the audio interface including a right audio signal interface to transfer the right channel of the audio and a left audio signal interface to transfer the left channel of the audio, the data encoded into the right channel out-of-phase relative to the left channel.

6. The master device as claimed in claim 5, further including an encoder/decoder (codec), the codec including an analog-to-digital converter (ADC) coupled to a microphone conductor of the audio jack, the logic further configured to include a filtering component coupled with an output of the ADC, the filtering component configured to isolate encoded data received in audio signals via a microphone conductor of the audio jack.

7. A system comprising:
    a master device including:
        a first audio interface including a first audio jack, the first audio interface including a first right audio signal interface to transfer a right audio channel and a first left audio signal interface to transfer a left audio channel;
        logic, at least a portion of which is partially implemented in hardware, the logic configured to encode data into audio as out-of-phase data tones and to transfer the audio with the data tones via the first audio interface and the first audio jack, the data encoded into the right channel out-of-phase relative to the left channel, wherein a first data tone of the data tones is included in a right channel of the audio and second data tone of the data tones is included in a left channel of the audio, wherein there is a phase difference between the first data tone and the second data tone; and a slave device including:
  a second audio interface including a second audio jack, the second audio interface including a second right audio signal interface to receive the right audio channel and a second left audio signal interface to receive the left audio channel;
  a data extractor coupled to the second audio interface, the data extractor including at least one of a self-powered out-of-phase tone voltage tripler or a low power out-of-phase tone pulse counter, the data extractor configured to:
    compare a first voltage of the received right audio channel to a second voltage of the received left audio channel to detect a difference indicative of tones having a phase and encoded on the right audio channel and the left audio channel, respectively; and
    responsive to the difference, output an indication of the data; and
  a microcontroller coupled to the data extractor to receive and process the data isolated by the data extractor.

8. A non-transitory machine-useable storage medium embodying instructions which, when executed by a machine, cause the machine to at least:
  control at least one of a self-powered out-of-phase tone voltage tripler or a low power out-of-phase tone pulse counter to compare a first voltage of the received right audio channel to a second voltage of the received left audio channel to detect a difference indicative of tones that are encoded out-of-phase on a right audio channel and a left audio channel, the audio received via an audio interface and an audio jack; and
  process data represented by the tones.

9. The machine-useable storage medium as claimed in claim 8, further configured to:
  receive data generated by a data-producing element,
  encode the data into an audio band signal,
  combine the encoded data with audio signals on a microphone line, and
  transfer the combined audio signals to a master device via a microphone conductor of the audio jack.

10. The machine-useable storage medium as claimed in claim 8, wherein the instructions are embodied in a slave device, the slave device from the group consisting of: a mobile phone headset and an earbud accessory.

11. The machine-useable storage medium as claimed in claim 8, wherein the isolated data is peripheral device configuration data.

* * * * *